United States Patent
Kim et al.

(10) Patent No.: US 12,541,698 B2
(45) Date of Patent: Feb. 3, 2026

(54) APPARATUS FOR LOW CNOT COUNT QUANTUM POINT-DOUBLING CIRCUITS

(71) Applicant: Pusan National University Industry-University Cooperation Foundation, Busan (KR)

(72) Inventors: Howon Kim, Busan (KR); Jaehan Cho, Busan (KR); Harashta Tatimma Larasati, Busan (KR); Rini Wisnu Wardhani, Busan (KR); Dedy Septono Catur Putranto, Busar (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 19/329,604

(22) Filed: Sep. 16, 2025

(65) Prior Publication Data
US 2026/0010812 A1   Jan. 8, 2026

Related U.S. Application Data

(63) Continuation of application No. 18/948,568, filed on Nov. 15, 2024.

(30) Foreign Application Priority Data

Dec. 29, 2023   (KR) .................. 10-2023-0197317

(51) Int. Cl.
*G06N 10/20*   (2022.01)

(52) U.S. Cl.
CPC .................... *G06N 10/20* (2022.01)

(58) Field of Classification Search
CPC ......... G06N 10/00; G06N 10/20; H03K 19/20
See application file for complete search history.

(56) References Cited

U.S. PATENT DOCUMENTS

| | | | |
|---|---|---|---|
| 2013/0246495 A1* | 9/2013 | Svore | G06N 10/60 708/491 |
| 2019/0156242 A1* | 5/2019 | Haener | H04L 9/0852 |
| 2020/0184024 A1* | 6/2020 | Nam | G06N 10/20 |
| 2020/0193072 A1* | 6/2020 | Johansson | G06F 7/722 |
| 2021/0157781 A1* | 5/2021 | Gidney | G06F 16/2228 |
| 2022/0067566 A1* | 3/2022 | Martiel | G06N 10/00 |
| 2022/0101165 A1* | 3/2022 | Gwinner | G06N 10/00 |
| 2022/0103178 A1* | 3/2022 | Szady | B82Y 10/00 |
| 2022/0335325 A1* | 10/2022 | Dallaire-Demers | G06N 10/60 |
| 2024/0193458 A1* | 6/2024 | Ahn | G06N 10/20 |
| 2024/0403679 A1* | 12/2024 | Lee | G06N 10/00 |
| 2025/0036995 A1* | 1/2025 | Lee | G06N 10/20 |
| 2025/0217686 A1* | 7/2025 | Kim | G06N 10/20 |
| 2025/0266841 A1* | 8/2025 | Kim | H03K 19/20 |

FOREIGN PATENT DOCUMENTS

| | | |
|---|---|---|
| KR | 20220099148 A | 7/2022 |
| KR | 20230091490 A | 6/2023 |
| KR | 20230128824 A | 9/2023 |

* cited by examiner

*Primary Examiner* — Jason M Crawford
(74) *Attorney, Agent, or Firm* — NKL Law; Jae Youn Kim

(57) ABSTRACT

Provided is an apparatus for a low CNOT count quantum point doubling circuit targeting to minimize resource consumption during quantum cryptanalysis, particularly in elliptic curve cryptography (ECC). The apparatus, according to an embodiment of this present invention, is designed to reduce the overall depth of cryptographic analysis by implementing an efficient point-doubling mechanism.

8 Claims, 10 Drawing Sheets

| Step | Point-addition [5] | | Point-doubling (first embodiment) | | Point-doubling (second embodiment) | | Point-doubling (third embodiment) | |
|---|---|---|---|---|---|---|---|---|
| | $q=1$ | $q=0$ | $q=1$ | $q=0$ | $q=1$ | $q=0$ | $q=1$ | $q=0$ |
| 1 | $x = x_1 + x_2$ | $x = x_1 + x_2$ | $anc_1 = \frac{y_1}{x_1}$ | $anc_1 = \frac{y_1}{x_1}$ | $anc_1 = \frac{y_1}{x_1}$ | $anc_1 = \frac{y_1}{x_1}$ | $anc_1 = \frac{y_1}{x_1}$ | $anc_1 = \frac{y_1}{x_1}$ |
| 2 | $y = y_1 + y_2$ | $y = y_1$ | $y = 0$ | $y = y_1$ | $y = 0$ | $y = y_1$ | $y = 0$ | $y = y_1$ |
| 3 | $\lambda = \frac{y_1 + y_2}{x_1 + x_2}$ | $\lambda = \frac{y_1}{x_1 + x_2}$ | $anc_1 = \frac{y_1}{x_1} + x_1 = \lambda$ | $anc_1 = \frac{y_1}{x_1} + x_1 = \lambda$ | $anc_1 = \frac{y_1}{x_1} + x_1 = \lambda$ | $anc_1 = \frac{y_1}{x_1} + x_1 = \lambda$ | $anc_1 = \frac{y_1}{x_1} + x_1 = \lambda$ | $anc_1 = \frac{y_1}{x_1} + x_1 = \lambda$ |
| 4 | $y = 0$ | $y = 0$ | $y = \lambda^2$ | $y = \lambda^2$ | $y = \lambda^2$ | $y = \lambda^2$ | $y = \lambda^2 + \lambda$ | $y = y_1$ |
| 5 | $y = \lambda^2$ | $y = \lambda^2$ | $y = \lambda^2 + \lambda$ | $y = \lambda^2 + \lambda$ | $y = \lambda^2 + \lambda$ | $y = \lambda^2 + \lambda$ | $y = \lambda^2 + \lambda + a = x_3$ | $y = y_1$ |
| 6 | $x = x_1 + x_3$ | $x = x_1 + x_3$ | $y = \lambda^2 + \lambda + a = x_3$ | $y = y_1$ | $y = \lambda^2 + \lambda + a = x_3$ | $y = y_1$ | | |
| 7 | $x = x_2 + x_3$ | $x = x_1 + x_3$ | $anc_2 = \lambda + 1$ | $anc_2 = \lambda + 1$ | $anc_2 = \lambda + 1$ | $anc_2 = \lambda + 1$ | $anc_2 = \lambda + 1$ | $anc_2 = \lambda + 1$ |
| 8 | $y = (x_2 + x_3) + \lambda$ | $y = 0$ | $anc_2 = (\lambda + 1)x_3$ | $anc_2 = (\lambda + 1)y_3$ | $anc_2 = (\lambda + 1)x_3$ | $anc_2 = (\lambda + 1)y_3$ | $anc_2 = (\lambda + 1)x_3$ | $anc_2 = (\lambda + 1)y_3$ |
| 9 | $y = 0$ | $y = 0$ | $x = x_1^2$ | $x = x_1$ | $x = x_1^2$ | $x = x_1$ | $x = x_1^3$ | $x = x_1$ |
| 10 | $\lambda = 0$ | $\lambda = 0$ | $x = x_1^2 + (\lambda+1)x_3 = y_3$ | $x = x_1$ | $x = x_1^2 + (\lambda+1)x_3 = y_3$ | $x = x_1$ | | |
| 11 | $\lambda = 0$ | $\lambda = 0$ | $none: x = x_3, y = y_3$ | $none: x = x_3, y = y_3$ | $anc_2 = 0$ | $anc_2 = 0$ | $anc_2 = 0$ | $anc_2 = 0$ |
| 12 | $x = x_3$ | $x = x_3$ | $swap: x = x_3, y = y_3$ | | $swap: x = x_3, y = y_3$ | $none: x = x_3, y = y_3$ | $swap: x = x_3, y = y_3$ | $none: x = x_3, y = y_3$ |
| 13 | $y = y_3$ | $y = y_3$ | | | | | $anc_3 = (\lambda+1) - 1 = \lambda$ | |
| 14 | | | | | | | $anc_1 = \lambda$ | $anc_1 = \lambda - x_1$ |
| 15 | | | | | | | $anc_1 = \lambda$ | $anc_1 = 0$ |

FIG. 10

APPARATUS FOR LOW CNOT COUNT QUANTUM POINT-DOUBLING CIRCUITS

CROSS-REFERENCE TO RELATED APPLICATIONS

This instant application claims priority to Korean Patent Application No. 10-2023-0197317, filed on Dec. 29, 2023, the disclosure of which is incorporated herein by reference in its entirety.

BACKGROUND OF THIS INVENTION

This invention relates to quantum computing technologies that are applicable to quantum computers. One or more embodiments of this invention relate to quantum cryptanalysis, and specifically, to an apparatus for a low controlled-NOT (CNOT) count quantum point doubling circuit that allows reducing the overall depth of cryptographic analysis of elliptic curve cryptography by designing a point doubling mechanism in a way that minimizes resource utilization.

An elliptic curve cryptography (ECC) is a main encryption technology in the field of public key cryptography based on the mathematical properties of elliptic curves.

Within the ECC, point addition and point doubling operations/processes play a crucial role in performing scalar multiplication. This scalar multiplication is used as a key operation in various cryptographic operations, such as public and private key generation, data encryption and decryption, and digital signature verification.

ECC is known to provide strong security with shorter key lengths compared to other public key cryptography techniques such as Rivest Shamir Adleman (RSA). Due to this computational efficiency, ECC is widely used in resource-constrained environments, such as mobile devices and embedded systems.

Improvements in point-addition and point-doubling operations are significant in enhancing the ECC implementation. These improvements may reduce processing time and energy consumption. Performing cryptanalysis for ECC in a quantum environment requires efficient arithmetic techniques to construct circuits that minimize resource consumption.

Various traditional algorithms have been developed in classical environments in order to perform cryptanalysis for ECC. With the advent of quantum computing and the anticipation of the speed improvements based thereon, the necessity to develop more optimized ECC arithmetic variants or recommend best practices for ECC use or ECC cryptanalysis has been raised.

The more efficient and faster ECC operations, the sooner it will be possible to determine how resistant ECC is to quantum computing, which will allow us to create quantum-resistant versions of ECC. Quantum resistance refers to algorithms that withstand code-breaking efforts from quantum computers.

Continuous research on point-addition and point-doubling in ECC may lead to improvements in algorithms, making ECC more efficient and practical. The optimized algorithm enables faster encryption operations and more secure ECC implementation. Moreover, since ECC is used in many cryptographic standards and protocols, advances in point-addition and point-doubling technologies may influence the development of new standards and recommendations.

This will ensure that ECC will continue to be an important and secure option for cryptographic applications.

Several research papers present specific details on the implementation of Shor's elliptic curve discrete logarithmic problem (ECDLP) for quantum cryptography. Zalka's initial contribution was to illustrate the feasibility of deriving comprehensive quantum circuits using the advanced Shor's ECDLP algorithm. The previous topic was extended by Roetteler et al. and Haner et al. in the context of decimal curve implementation. Moreover, Banegas et al. and Putranto et al. applied this topic to binary elliptic curves. However, these studies failed to specifically examine the point-doubling circuit.

FIG. 1 is a visual representation of the hierarchy used in the implementation of finite field arithmetic in the context of ECC.

Efficient implementation of arithmetic operations in binary and primary finite fields relies heavily on basic field operations, including modular addition, subtraction, multiplication, squaring, and reciprocal numbers.

Meanwhile, Shor's algorithm uses a method to systematically explore the scalar multiplication of all possible quantum states to solve the ECDLP. This algorithm utilizes quantum interference to increase the likelihood of obtaining the desired result and, at the same time, contributes to reducing the occurrence of unwanted values by using the quantum Fourier transform (QFT).

Shor's algorithm deals with the ECDLP and may be described as a method for systematically computing the scalar product of all possible states.

However, this involves utilizing quantum interference and the QFT to hide unwanted values while improving the likelihood of achieving the desired result.

FIG. 2 illustrates a quantum circuit diagram of the Shor's algorithm for ECDLP decoding.

As shown in FIG. 2, authors such as Roetteler et al., Banegas et al., and Putranto et al., have proved that the computations required to solve ECC with an ECDLP using Shor's algorithm maintain consistency through a series of point-addition operations.

In general, a binary elliptic curve is given by $y^2+xy=x^3+ax^2+b$, where $a \in F_2$ and $b \in F^*_{2_m}$.

The points on this curve are given as tuples $P=(x, y) \in F^2_{2^m}$, which satisfies the curve operation. The special point O is called the 'point of infinity' and acts as a neutral element.

The negative number of point $P_1=(x_1, y_1)$ is $P_1=(x_1, y_1+x_1)$, and thus, $P_1+(-P_1)=0$. Two points $P_1=(x_1, y_1)$ and $P_2=(x_2, y_2) \neq \pm P_1$ are added to produce $P_1+P_2=P_3=(x_3, y_3)$, and where $$\lambda = \frac{y_1 + y_2}{x_1 + x_2},$$

$x_3 \lambda^2 + \lambda + x_1 + x_2 + a$ and $y_3 = (x_2 + x_3)\lambda + x_3 + y_2$.

For the double value of $P_1$ (where $P_1 \neq -P_1$) in other words, $P_1+P_1$, is $2P_1=(x_3, y_3)$ and $x_3=\lambda^2+\lambda+a$ and $y_3=x_1^2+(\lambda+1)x_3$, where $$\lambda = x_1 + \frac{y_1}{x_1}.$$

FIG. 3 illustrates a point addition circuit diagram for a binary elliptic curve.

FIG. 3 shows the point-addition circuit in the binary case for Shor's quantum circuit, specifically covering the design of Roetteler et al., focusing on a point-addition which refers to the quantum circuit of Banegas et al.

This circuit requires three registers, in which each of the sizes is indicated by n.

Two of these registers are designated for input or output purposes and the remaining register performs as a clean ancilla register. Moreover, a single qubit is used as the control element.

Variables represent the modular multiplication operation and the square operation with separate outputs and represent the division operation.

Quantum computers are vulnerable to various error causes, such as gate errors, decoherence, and crosstalk. As the depth of the circuit decreases, the number of gates and operations decreases, minimizing the possibility of error accumulation.

Error correction in the context of quantum computing, minimizing the error rate, is of utmost importance.

Consequently, there is a growing need to develop new approaches that can reduce the overall cryptanalysis depth of elliptic curve cryptography by designing a point-doubling mechanism that minimizes resource utilization.

SUMMARY OF THE INVENTION

One of the purposes of the present invention is to solve the problems of conventional quantum cryptanalysis technology of the prior art and to provide an apparatus for a low CNOT count quantum point-doubling circuit such that reduction of the overall cryptanalysis depth of ECC may be achieved by designing the point-doubling mechanism in a way that minimizes resource utilization.

Another purpose of the present invention is to provide an apparatus for a low CNOT count quantum point doubling circuit, which may achieve a reduction in depth quantum resources required to enhance computing capabilities by integrating a point-doubling design into an ECC cryptographic analysis circuit which conventionally relies solely on point-addition.

Another purpose of the present invention is to provide an apparatus for a low CNOT count quantum point doubling circuit that can minimize the possibility of error accumulation by reducing the circuit depth and, thus, reducing the number of gates and operations.

Other purposes of the present invention are not limited to the purposes mentioned above, and such purposes not mentioned herein may be clearly understood by those skilled in the art based on the description below.

To achieve the purposes, an embodiment, according to the present invention, may include a quantum circuit featuring an operational module designed to minimize the number of operations and quantum gates, resulting in output with an uninitialized ancilla register and achieving the lowest possible CNOT usage.

Another embodiment, according to the present invention, may include a quantum circuit for performing point addition, which includes a multiplication circuit to uncompute the value of one of the ancilla registers. This may result in an output where one ancilla register is initialized while another remains uninitialized, all achieved through minimal operational steps;

Another embodiment, according to the present invention, may include a quantum circuit, which conditionally initializes the value of the ancilla registers for reuse. In this configuration, one ancilla register may remain uninitialized when q=0 and two ancilla registers are initialized when q=1, using a minimal number of qubits and operational modules.

More specifically, according to an embodiment of the present invention, an apparatus for a low controlled NOT (CNOT) count quantum point doubling circuit may comprise: a first quantum register to which a control qubit $|q\rangle$ is input, a second quantum register to which a quantum register value $|x_1\rangle$ is input, a third quantum register to which a quantum register value $|y_1\rangle$ is input, a first ancilla register to which $|0\rangle$ is input, and a second ancilla register to which $|0\rangle$ is input, wherein $x_1$ and $y_1$ are coordinate values indicating a point in an elliptic curve, $|x_1\rangle$ and $|y_1\rangle$ indicate quantum states thereof, and q represents a value of the input control qubit $|q\rangle$; a division operation block configured to output a first value of the first ancilla register as $$anc_1 = \frac{y_1}{x_1},$$

using the quantum register values $|x_1\rangle$ and $|y_1\rangle$; a first multiplication operation block with a triple-controlled gate structure configured to output a value of $y_A=0$, when q=1, and $y_A=y_1$, when q=0; a CNOT gate configured to output a second value of the first ancilla register as $$anc_1 = \frac{y_1}{x_1} + x_1 = \lambda,$$

wherein $\lambda$ indicates a gradient having a value of $$\frac{y_1}{x_1} + x_1;$$

a controlled out-of-place squaring block configured to output a value of $y_B=\lambda^2$, when q=1, and $y_B=y_1$, when q=0; a first Toffoli gate configured to output a value of $y_C=\lambda^2+\lambda$, when q=1, and $y_C=y_1$, when q=0; a constant addition block configured to output $y_D=\lambda^2+\lambda+a=x_3$, when q=1, and $y_D=y_1$, when q=0, wherein $x_3$ is a value derived from $x_1$ and $y_1$ in a point doubling calculation process, and a is a constant; a first constant addition block configured to output a third value of the first ancilla register as $anc_1=\lambda+1$; a controlled in-place squaring block configured to output a first value of the second ancilla register as $anc_2=(\lambda+1)x_3$, when q=1, and $anc_2=(\lambda+1)y_1$, when q=0; a second multiplication operation block configured to output a value of $x_A=x_1^2$, when q=1, and $x_A=x_1$, when q=0; and a second Toffoli gate configured to output $x_B=x_1^2+(\lambda+1)x_3=y_3$, when q=1, and $x_B=x_1$, when q=0, wherein $y_3$ is a value derived from $x_1$ and $y_1$ in the point doubling calculation process.

According to another embodiment of this present invention, the circuit may further comprise: a controlled swap block configured to output swap: $x_B=x_3$, $y_D=y_3$, when q=1, and none: $x_B=x_1$, $y_D=y_1$, when q=0. Further, a final output value of the first ancilla register may be $anc_1=|\lambda+1\rangle$, and a final output value of the second ancilla register may be $anc_2=|(\lambda+1)x_3\rangle$ or $anc_2=|(\lambda+1)y_1\rangle$.

According to another embodiment, the circuit may further comprise: a third multiplication operation block configured to output a second value of the second ancilla register as $anc_2=0$; and a controlled swap block configured to output swap: $x_B=x_3$, $y_D=y_3$, when q=1, and outputs none: $x_B=x_1$, $y_D=y_1$, when q=0. Further, according to the embodiment of the present invention, a final output value of the first ancilla register may be $anc_1 = |\lambda+1\rangle$, and a final output value of the second ancilla register may be $anc_2 = |0\rangle$.

According to another embodiment, the circuit may further comprise: a second constant addition block configured to output a fourth value of the first ancilla register as $anc_1 = (\lambda+1)-1 = \lambda$ when q=1, and $anc_1 = \lambda$ when q=0. Further, the circuit may further comprise a negative control Toffoli gate configured to output a fifth value of the first ancilla register as $anc_1 = \lambda$, when q=1, and $$anc_1 = \lambda - x_1 = \frac{y_1}{x_1},$$

when q=0; and a negative controlled division block configured to output a sixth value of the first ancilla register as $anc_1 = \lambda$, when q=1, and $anc_1 = 0$, when q=0. Further, according to the embodiment of the present invention, a final output value of the first ancilla register may be $anc_1 = |\lambda\rangle$ or $anc_1 |0\rangle$, and a final output value of the second ancilla register may be $anc_2 = |0\rangle$.

As explained above, an apparatus for a low CNOT count quantum point doubling circuit, according to the present invention as described above, may have the following advantages.

The overall cryptographic depth of ECC may be reduced by designing the point-doubling mechanism in a way that minimizes resource utilization.

Further, a reduction in the depth of quantum resources required to enhance computing capabilities may be achieved by integrating a point-doubling design into ECC cryptographic analysis circuits that currently rely solely on point-addition.

Further, by reducing the circuit depth, the numbers of gates and operations are reduced, thereby minimizing the possibility of error accumulation may be achieved.

BRIEF DESCRIPTION OF THE DRAWINGS

FIG. 10 is a table comparing step computation of the first, second, and third embodiments of the present invention.

DETAILED DESCRIPTION OF EXEMPLARY EMBODIMENTS

Figure 1:
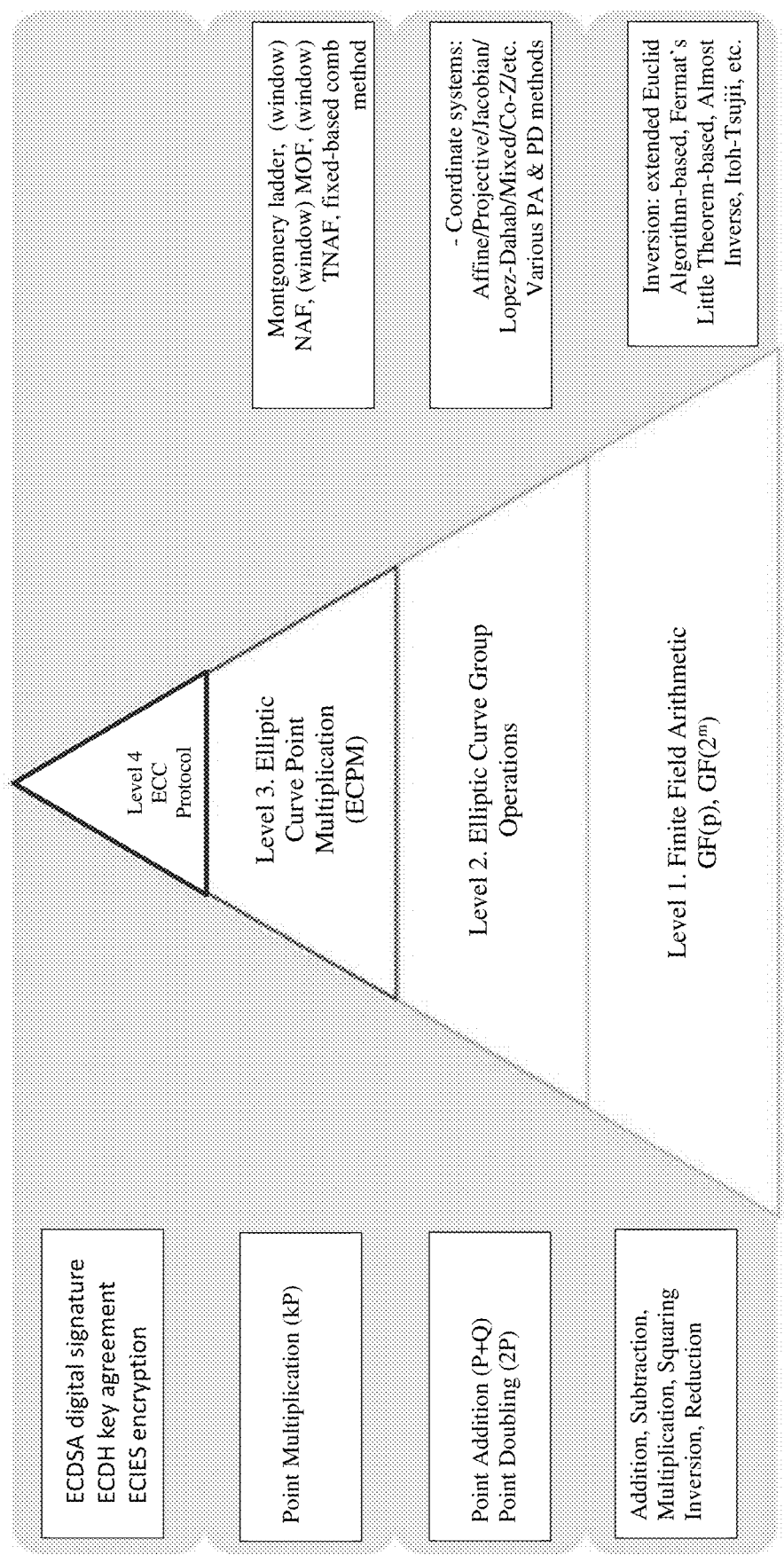
FIG. 1 illustrates a hierarchical diagram used to implement finite field arithmetic in the context of elliptic curve cryptography (ECC).
Figure 2:
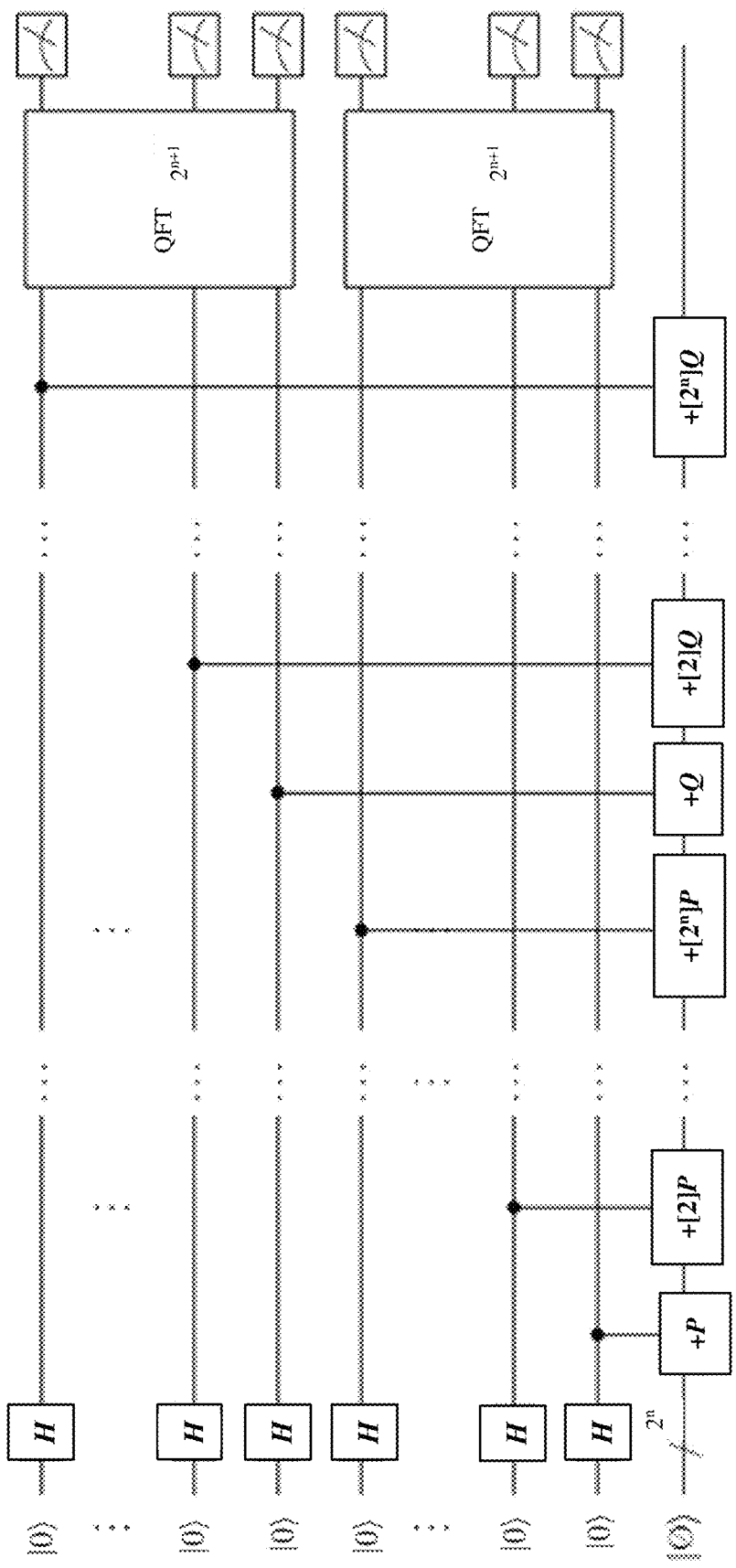
FIG. 2 illustrates a quantum circuit diagram of the Shor algorithm for ECDLP decryption.
Figure 3:
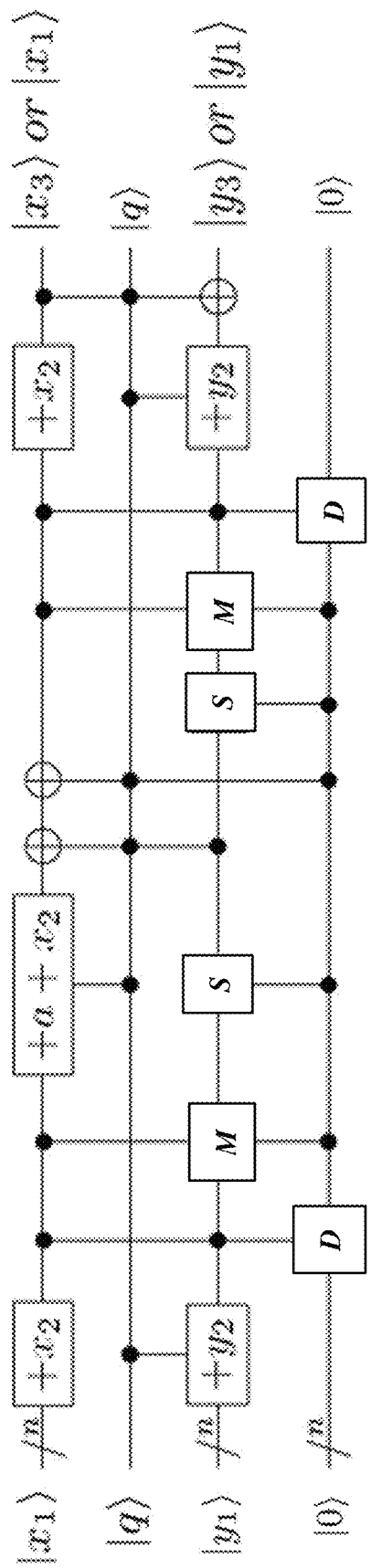
FIG. 3 illustrates a point-addition circuit diagram for a binary elliptic curve.

Hereinafter, an embodiment of the apparatus for a low CNOT count quantum point doubling circuit according to an embodiment of the present invention may be described in detail as follows.

The features and advantages of the device for a low CNOT count quantum point doubling circuit according to the present invention would become apparent through the detailed description of each embodiment disclosed herein.

The terms used in this disclosure have been selected as widely used as possible in consideration of the functions of this disclosure, but they may vary depending on the intentions or precedents of a person in the art, the emergence of new technologies, etc. Moreover, in certain cases, there are terms arbitrarily selected by the applicant, and in this case, the meaning will be described in detail in the description of the applicable invention. Therefore, the terms used in this disclosure should be defined based on the meaning of the terms and the overall content of this disclosure, not just the name of the terms.

As used herein, the word "exemplary" means "serving as an example, instance or illustration." The embodiments described herein are not limiting but rather are exemplary only. It should be understood that the described embodiments are not necessarily to be construed as preferred or advantageous over other embodiments. Moreover, the terms "embodiments of the invention", "embodiments", or "invention" do not require that all embodiments of the invention include the discussed feature, advantage, or mode of operation.

Further, many embodiments are described in terms of sequences of actions to be performed by, for example, elements of a computing device. It will be recognized that various actions described herein can be performed by specific circuits (e.g., application-specific integrated circuits (ASICs)), by program instructions being executed by one or more processors, or by a combination of both. Additionally, these sequences of actions described herein can be considered to be embodied entirely within any form of computer-readable storage medium, having stored therein a corresponding set of computer instructions that, upon execution, would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Expressions in a singular form are to be understood as including a meaning of a plural form unless the context explicitly indicates otherwise, a term such as "comprising" or "including" is intended to designate the presence of characteristics, numbers, steps, operations, elements, parts, or combinations thereof that are implemented, and should not be understood to preclude any possibility of the presence or addition of one or more other characteristics, numbers, steps, operations, elements, parts, or combinations thereof.

When a part of the entire specification "includes" a component, this means that other components may be further included rather than excluding other components unless otherwise stated. In addition, the terms "part," "module" and the like described in the specification refer to units that process at least one function or operation, which may be implemented in hardware or software or a combination of hardware and software.

The apparatus for a low CNOT count quantum point doubling circuit according to an embodiment of the present invention designs a point-doubling mechanism in a manner that minimizes resource utilization, thereby reducing the overall depth of cryptanalysis of ECC.

To this end, this invention may include a configuration that integrates a point-doubling design into the ECC circuit that currently relies solely on the point-addition to implement a reduction in depth quantum resources required to enhance computing functions.

This present invention may include a configuration that minimizes the possibility of error accumulation by reducing the circuit depth, which may be achieved by reducing the number of gates and operations.

If the two points in a specific scenario have the same value, a point-addition subroutine should be replaced by a point-doubling operation.

The present invention makes it possible to design a more efficient quantum ECC encryption circuit (capable of performing point-addition and point-doubling) with a lower-depth point-addition design.

The relative importance of optimizing depth and width in quantum computing applications may vary in certain situations, and decisions may involve balancing factors that should be considered, such as, computational efficiency, resource utilization, and algorithmic requirements.

This present invention has successfully achieved depth utilization through the implementation of the point-doubling technique, and there are two advantages of depth optimization: reduction of the number of gates required for a shallow circuit and shortening the execution time thereof. These advantages ultimately contribute to reducing computation time, and they may be compatible with and complement the limitations of current quantum hardware.

Figure 4:
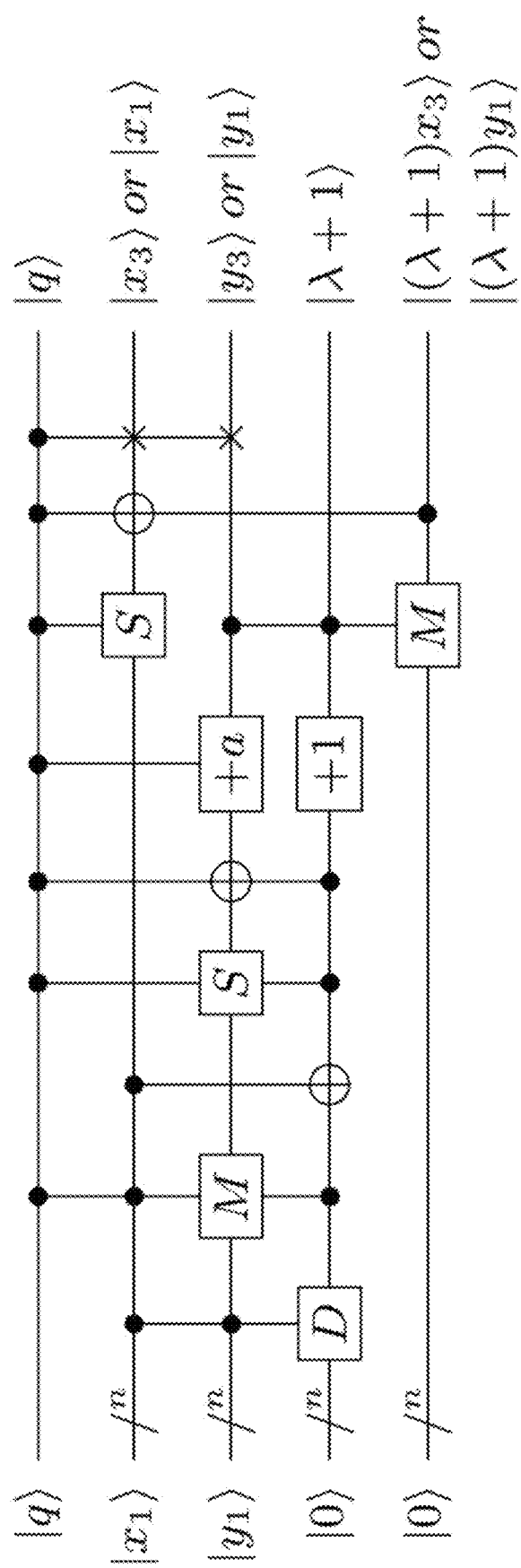
FIG. 4 illustrates a schematic diagram of an apparatus for a low CNOT count quantum point doubling circuit according to the first embodiment of the present invention.

FIG. 4 illustrates a structural diagram for a low CNOT count quantum point doubling circuit according to the first embodiment of the present invention.

An apparatus for a low CNOT count quantum point doubling circuit, according to the first embodiment of the present invention, is an operation module focusing on a small number of computational processes and a small number of gates.

The apparatus, according to the embodiment of the present invention, is an operation module produced with a focus on a small number of operations and gates, and the result of the operation may produce an ancilla register whose value is uninitialized.

The apparatus, according to the embodiment of the present invention, may have a circuit structure that performs only the expected point-doubling operations without considering the uncompute as to the ancilla registers, and it is possible to minimize depth and subroutine count, but two uninitialized ancilla registers may remain, and the first multiplication subroutine may have a structure that includes a triple control gate.

Figure 5:
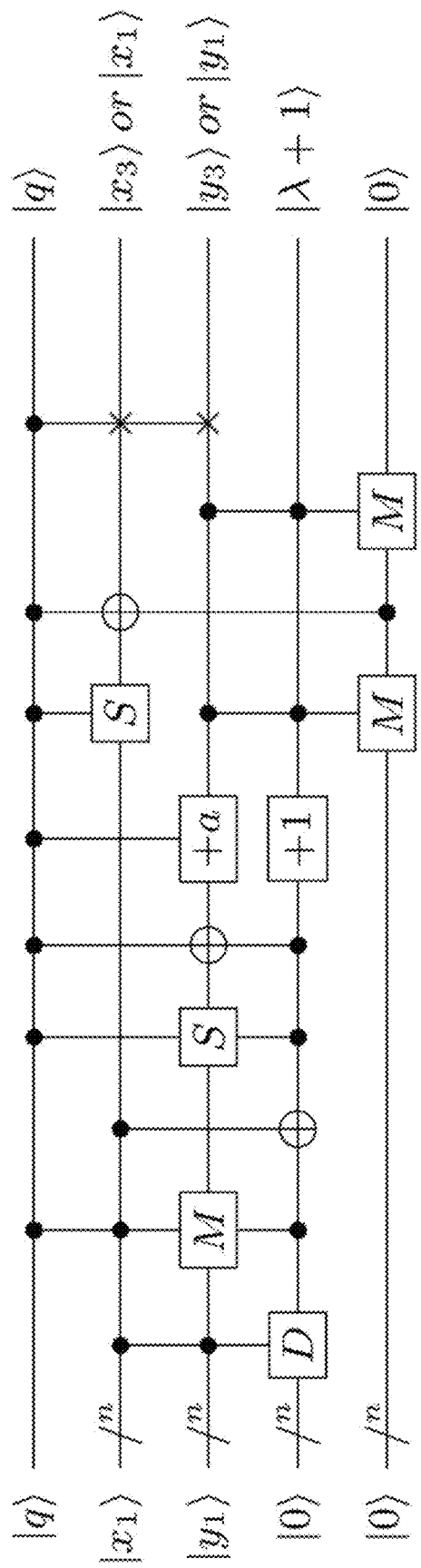
FIG. 5 illustrates a schematic diagram of an apparatus for a low CNOT count quantum point doubling circuit according to the second embodiment of the present invention.

FIG. 5 illustrates an apparatus configuration diagram for a low CNOT count quantum point doubling circuit according to a second embodiment of the present invention.

The apparatus for a low CNOT count quantum point doubling circuit, according to the second embodiment of the present invention, may have a circuit structure that balances the number of operations and the auxiliary register clearing requirements, as shown in FIG. 5.

In other words, the apparatus, according to the second embodiment, may have a balance between performing fewer mathematical operations in the circuit and reducing the need to remove unnecessary data from additional registers.

The apparatus, according to the embodiment of the present invention may have a structure that adds a multiplication circuit to perform operation clearing one of the ancilla registers.

The apparatus, according to the embodiment of the present invention, may have an operation structure that applies a compromise between the number of calculations performed by the operation circuit and the initialization of ancilla register values, and thus, it may have the ancilla register whose value has been initialized and the ancilla register whose value has not been initialized as an output value through a minimum operation step.

The apparatus, according to the embodiment of the present invention, may comprise a first multiplication subroutine, including a triple control gate.

An apparatus for a low CNOT count quantum point doubling circuit, according to a third embodiment, may be described as follows.

Figure 6:
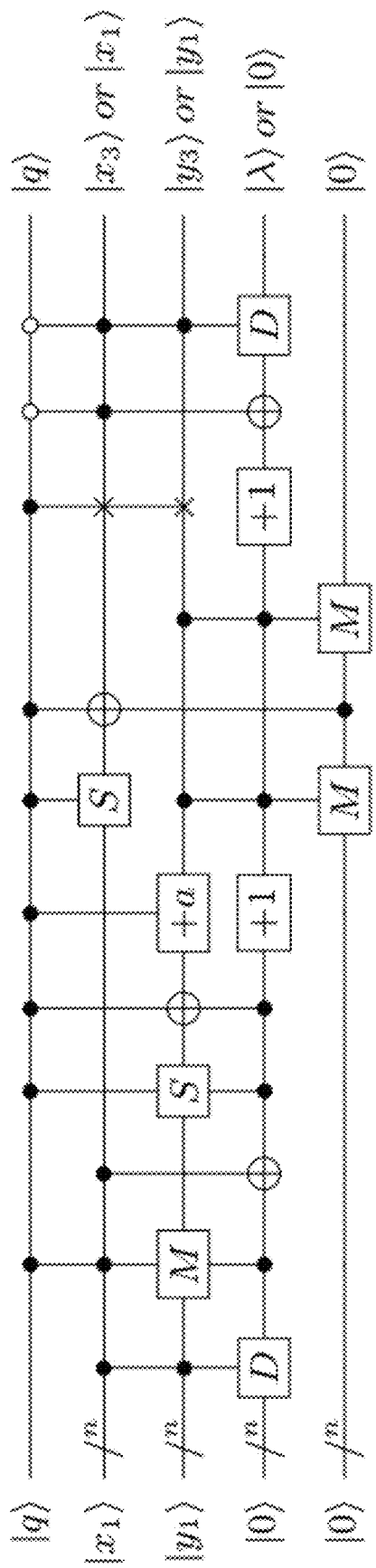
FIG. 6 illustrates a schematic diagram of an apparatus for a low CNOT count quantum point doubling circuit according to the third embodiment of the present invention.

FIG. 6 illustrates a structural diagram of an apparatus for a low CNOT count quantum point doubling circuit according to the embodiment.

The apparatus, according to the third embodiment of the present invention, may effectively initialize all ancilla registers and may add an additional controlled multiplication circuit and a Toffoli gate targeting the ancilla registers.

In other words, the apparatus may be an operation module that conditionally initializes the ancilla register value for reusing a small number of qubits and operation modules, and one ancilla register is not initialized when q=0 and two ancilla registers are initialized when q=1.

The main objective of point-doubling in an apparatus for a low CNOT count quantum point doubling circuit, according to the third embodiment of the present invention, is to initialize all ancilla registers effectively.

In the apparatus, the uncompute process is not thoroughly executed for all possible states of the control qubit ($|0\rangle$ or $|1\rangle$). In the present invention, the symbol q represents a register control and can have the specific values of 0 or 1, and $|q\rangle$ represents a register control without a specific value assigned. The value 0 fills the entire contents of an n-sized register within a circuit. This distinction explains the difference in notation, using either q or $|q\rangle$ based on whether a specific value is referenced in the context.

When q is 0, a complete uncompute may be performed. However, when q is 1, the ancilla variable $\lambda$ remains in an incomplete state.

It should be considered that the value of $\lambda$ in the previous state $$x_1 + \frac{y_1}{x_1}$$

may not match the value of $\lambda$ in the subsequent operation $$x_3 + \frac{y_3}{x_3}.$$

Due to such potential discrepancy, it is not recommended to use $x_3$ and $y_3$ to uncompute $\lambda$ when q=1. A fully uncomputed and initialized ancilla register could have been obtained if the conditions were the same.

One possible approach to achieve this goal is to introduce an additional controlled multiplication circuit and apply a Toffoli gate targeting the ancilla register.

An alternative method may be used to facilitate complete uncompute when the control qubit q equals 0. Moreover, when q equals 1, an uninitialized ancilla register in the state λ may remain.

The circuit is designed to perform full uncompute when qubit q is in state 0. However, if q is in any other state, one ancilla qubit is left as λ.

Table 1 shows the point-doubling step computation for the low CNOT count quantum point-doubling circuit according to the first, second, and third embodiments of the present invention.

TABLE 1

| Step | q = 1 | q = 0 |
|---|---|---|
| 1 | $anc_1 = \frac{y_1}{x_1}$ | $anc_1 = \frac{y_1}{x_1}$ |
| 2 | y = 0 | y = $y_1$ |
| 3 | $anc_1 = \frac{y_1}{x_1} + x_1 = \lambda$ | $anc_1 = \frac{y_1}{x_1} + x_1 = \lambda$ |
| 4 | y = $\lambda^2$ | y = $y_1$ |
| 5 | y = $\lambda^2 + \lambda$ | y = $y_1$ |
| 6 | y = $\lambda^2 + \lambda + a = x_3$ | y = $y_1$ |
| 7 | $anc_1 = \lambda + 1$ | $anc_1 = \lambda + 1$ |
| 8 | $anc_2 = (\lambda + 1)x_3$ | $anc_2 = (\lambda + 1)y_1$ |
| 9 | x = $x_1^2$ | x = $x_1$ |
| 10 | x = $x_1^2 + (\lambda + 1)x_3 = y_3$ | x = $x_1$ |
| 11 | $anc_2 = 0$ | $anc_2 = 0$ |
| 12 | swap: x = $x_3$, y = $y_3$ | none: x = $x_1$, y = $y_1$ |
| 13 | $anc_1 = (\lambda + 1) - 1 = \lambda$ | $anc_1 = \lambda$ |
| 14 | $anc_1 = \lambda$ | $anc_1 = \lambda - x_1 = \frac{y_1}{x_1}$ |
| 15 | $anc_1 = \lambda$ | $anc_1 = 0$ |

The point doubling step computation characteristic in the apparatus for the low CNOT count quantum point doubling circuit according to the first embodiment of the present invention is up to line 10 in Table 1 (the first embodiment), the point doubling state change characteristic in the apparatus for the low CNOT count quantum point doubling circuit according to the second embodiment of the present invention is up to line 12 in Table 1 (the second embodiment), and the point doubling state change characteristic in the apparatus for the low CNOT count quantum point doubling circuit according to the third embodiment of the present invention is up to line 15 in Table 1 (the third embodiment).

Figure 7:
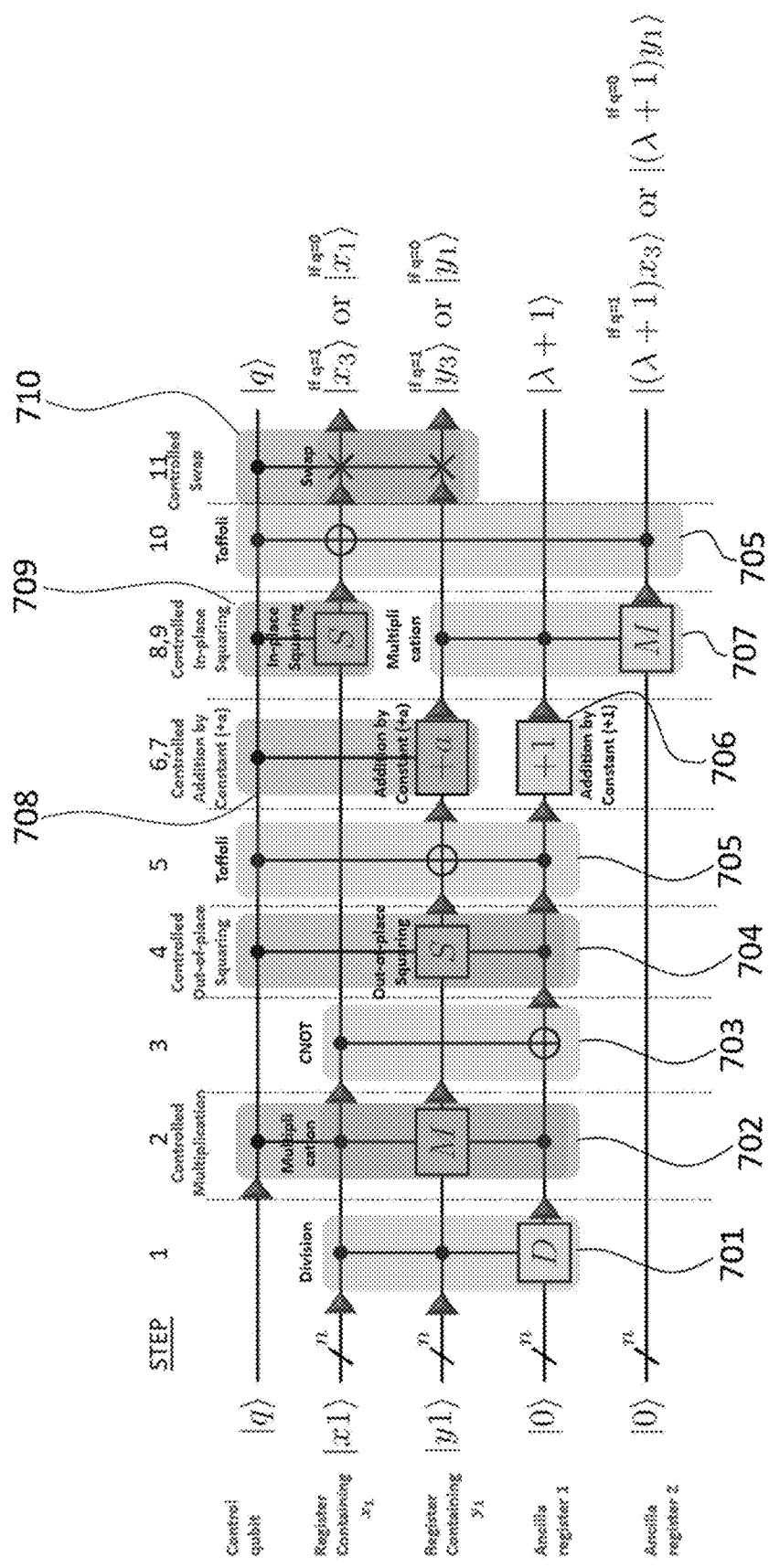
FIG. 7 illustrates a schematic diagram for explaining the operation of an apparatus for a low CNOT count quantum point doubling circuit according to the embodiment disclosed in FIG. 4.

FIG. 7 is a block diagram illustrating the operation of an apparatus for a low CNOT count quantum point doubling circuit according to the first embodiment of the present invention.

The apparatus for the low CNOT count quantum point doubling circuit according to the first embodiment of the present invention, shown in FIG. 7, has a point doubling state change with the control qubit (|q⟩) as input, and includes a division operation block 701 performing a division operation and outputting $$\frac{y_1}{x_1}$$

with register values |$x_1$⟩ and |$y_1$⟩; a first multiplication operation block 702 having a triple-controlled gate structure as the first multiplication subroutine and outputting y=0 when q=1, and y=$y_1$ when q=0; a CNOT gate 703 outputting the value of the first ancilla register (Ancilla register 1) as $$anc_1 = \frac{y_1}{x_1} + x_1 = \lambda;$$

a controlled out-of-place squaring block 704 outputting y=$\lambda^2$ when q=1, and y=$y_1$ when q=0; a first Toffoli gate 705 outputting y=$\lambda^2+\lambda$ when q=1, and y=$y_1$ when q=0; a constant addition block (+a) 708 outputting y=$\lambda^2+\lambda+a=x_3$ when q=1, and y=$y_1$ when q=0; a first constant addition block (+1) 706 outputting the value of the first ancilla register (Ancilla register 1) as $anc_1=\lambda+1$;

a controlled in-place squaring block 709 outputting the value of a second ancilla register (Ancilla register 2) as $anc_2=(\lambda+1)x_3$ when q=1, and $anc_2=(\lambda+1)y_1$ when q=0; a second multiplication operation block 707 outputting x=$x_1^2$ when q=1, and x=$x_1$ when q=0; and a second Toffoli gate 705 outputting x=$x_1^2+(\lambda+1)x_3=y_3$ when q=1, and x=$x_1$ when q=0.

The apparatus may further include a controlled swap block 710 outputting swap: x=$x_3$, y=$y_3$ when q=1, and none: x=$x_1$, y=$y_1$ when q=0.

Here, the final output of the first ancilla register (Ancilla register 1) may be |λ+1⟩, and the final output of the second ancilla register (Ancilla register 2) may be |(λ+1)$x_3$⟩ or |(λ+1)$y_1$⟩. In this embodiment, q, x, y are quantum inputs stored in each register to hold the values being calculated, $x_1$ and $y_1$ are coordinate values indicating a point in an elliptic curve, and $x_3$ and $y_3$ are values derived from a point doubling process with respect to $x_1$ and $y_1$. λ is a gradient defined as $$\frac{y_1}{x_1} + x_1,$$

and a is a constant obtained from the point doubling calculation process where a∈$F_2$.

Figure 8:
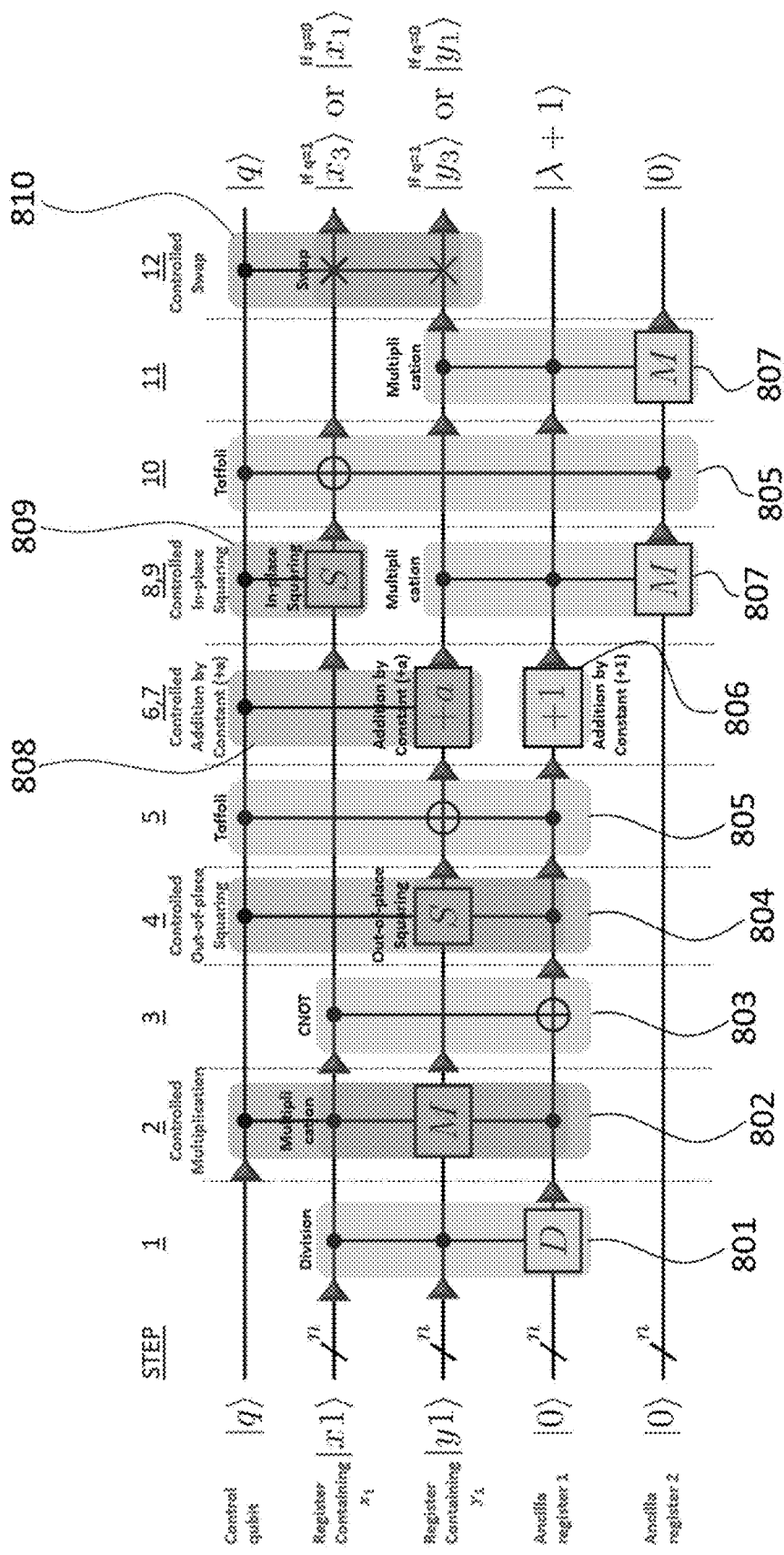
FIG. 8 illustrates a schematic diagram for explaining the operation of an apparatus for a low CNOT count quantum point doubling circuit according to the embodiment disclosed in FIG. 5.

FIG. 8 is a block diagram illustrating the operation of an apparatus for a low CNOT count quantum point doubling circuit according to the second embodiment of the present invention.

FIG. 8 illustrates a point doubling state change with the control qubit (|q⟩) as input which includes a division operation block 801 performing a division operation with register values |$x_1$⟩ and |y⟩, outputting;

$$\frac{y_1}{x_1};$$

a first multiplication operation block 802 having a triple-controlled gate structure as the first multiplication subroutine and outputting y=0 when q=1, and y=$y_1$ when q=0, a CNOT gate 803 outputting the value of the first ancilla register (Ancilla register 1) as $$anc_1 = \frac{y_1}{x_1} + x_1 = \lambda;$$

a controlled out-of-place squaring block 804 outputting y=$\lambda^2$ when q=1 and y=$y_1$ when q=0; a first Toffoli gate 805 outputting y=$\lambda^2+\lambda$ when q=1, and y=$y_1$ when q=0; a constant addition block (+a) 808 outputting y=$\lambda^2+\lambda+a=x_3$ when q=1, and y=$y_1$ when q=0; a first constant addition block (+1) 806 outputting $anc_1=\lambda+1$ for the value of the first ancilla register (Ancilla register 1); a controlled in-place squaring block 809 outputting $anc_2=(\lambda+1)x_3$ when q=1, and $anc_2=(\lambda+1)y_1$ when q=0 as the value of the second ancilla register (Ancilla register 2); a second multiplication operation block 807 outputting x=$x_1^2$ when q=1, and x=$x_1$ when q=0; a second Toffoli gate 805 outputting x=$x_1^2+(\lambda+1)x_3=y_3$ when q=1, and x=$x_1$ when q=0; a third multiplication operation block 807 outputting $anc_2=0$ for the value the second ancilla register (Ancilla register 2); and a controlled swap block 810 outputting swap: x=$x_3$, y=$y_3$ when q=1, and none: x=$x_1$, y=$y_1$ when q=0.

Here, the final output of the first ancilla register (Ancilla register 1) may be |$\lambda$+1⟩ and the final output of the second ancilla register (Ancilla register 2) may be |0⟩.

In this embodiment, q, x, y are quantum inputs stored in each register to hold the values being calculated, $x_1$ and $y_1$ are coordinate values indicating a point in an elliptic curve, and $x_3$ and $y_3$ are values derived from a point doubling process with respect to $x_1$ and $y_1$. $\lambda$ is a gradient defined as $$\frac{y_1}{x_1} + x_1,$$

and a is a constant obtained from the point doubling calculation process where $a \in F_2$.

Figure 9:
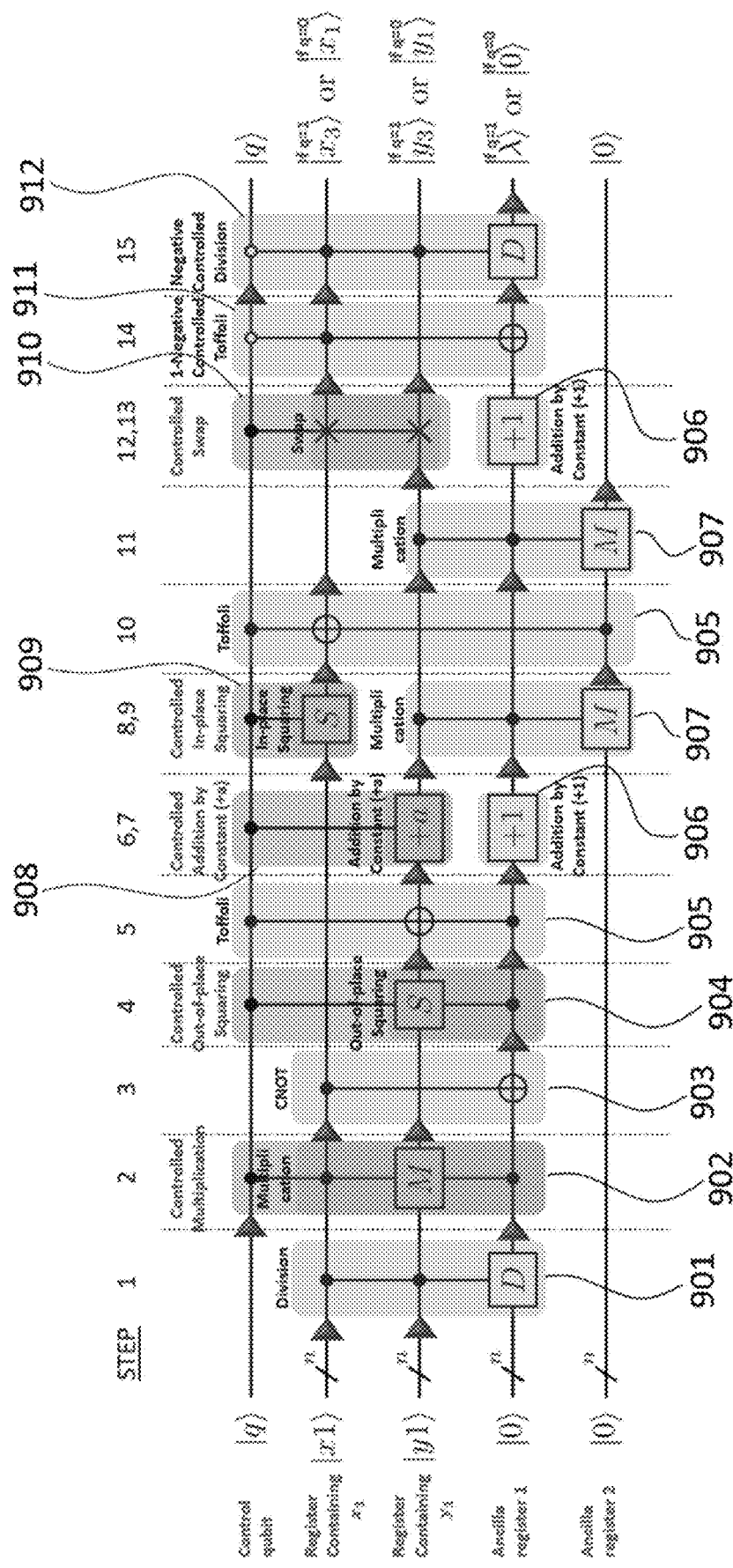
FIG. 9 illustrates a schematic diagram for explaining the operation of an apparatus for a quantum point doubling circuit according to the embodiment disclosed in FIG. 6.

FIG. 9 is a block diagram illustrating the operation of an apparatus for a low CNOT count quantum point doubling circuit according to the third embodiment of the present invention.

The apparatus according to the third embodiment of the present invention, as shown in FIG. 9, has a point doubling state change with the control qubit (|q⟩) as input and includes a division operation block 901 performing a division operation with register values |$x_1$⟩ and |$y_1$⟩, outputting $$\frac{y_1}{x_1};$$

a first multiplication operation block 902 having a triple-controlled gate structure as the first multiplication subroutine and outputting y=0 when q=1, and y=$y_1$ when q=0; a CNOT gate 903 outputting the value of the first ancilla register (Ancilla register 1) as $$anc_1 = \frac{y_1}{x_1} + x_1 = \lambda;$$

a controlled out-of-place squaring block 904 outputting y=$\lambda^2$ when q=1, and y=$y_1$ when q=0; a first Toffoli gate 905 outputting y=$\lambda^2+\lambda$ when q=1, and y=$y_1$ when q=0; a constant addition block (+a) 908 outputting y=$\lambda^2+\lambda+a=x_3$ when q=1, and y=$y_1$ when q=0; a first constant addition block (+1) 906 outputting $anc_1=\lambda+1$ for the value of the first ancilla register (Ancilla register 1); a controlled in-place squaring block 909 outputting $anc_2=(\lambda+1)x_3$ when q=1, and $anc_2=(\lambda+1)y_1$ when q=0 for the value of the second ancilla register (Ancilla register 2); a second multiplication operation block 907 outputting x=$x_1^2$ when q=1, and x=$x_1$ when q=0; a second Toffoli gate 905 outputting x=$x_1^2+(\lambda+1)x_3=y_3$ when q=1, and x=$x_1$ when q=0; a third multiplication operation block 907 outputting the value of the second ancilla register (Ancilla register 2) as $anc_2=0$; a controlled swap block 910 outputting swap: x=$x_3$, y=$y_3$ when q=1, and none: x=$x_1$, y=$y_1$ when q=0; a second constant (+1) addition block 906 outputting the value of the first ancilla register (Ancilla register 1) as $anc_1=(\lambda+1)-1=\lambda$ when q=1, and $anc_1=\lambda$ when q=0; a negative control Toffoli gate (1−Negative Control Toffoli gate) 911 outputting the value of the first ancilla register (Ancilla register 1) as $anc_1=\lambda$ when q=1, and $$anc_1 = \lambda - x_1 = \frac{y_1}{x_1}$$

when q=0, and a negative controlled division block 912 outputting the value of the first ancilla register (Ancilla register 1) as $anc_1$=|$\lambda$⟩ when q=1, and $anc_1$=|0⟩ when q=0, wherein the final output value of second ancilla register is $anc_2$=|0⟩. In this embodiment, q, x, y are quantum inputs stored in each register to hold the values being calculated, $x_1$ and $y_1$ are coordinate values indicating a point in an elliptic curve, and $x_3$ and $y_3$ are values derived from a point doubling process with respect to $x_1$ and $y_1$. A is a gradient defined as $$\frac{y_1}{x_1} + x_1,$$

and a is a constant obtained from the point doubling calculation process where $a \in F_2$.

In the embodiments, the division operation block, the first and second multiplication operation blocks, the controlled out-of-place squaring block, the constant addition block, the controlled in-place squaring block, and the controlled swap block may refer to each applicable quantum logic gate.

The low-CNOT-count quantum point-doubling circuit described in this invention is designed to minimize resource usage while implementing the point-doubling mechanism. This approach reduces the overall cryptographic analysis depth of ECC by integrating the point-doubling design into ECC cryptographic analysis circuits, which currently rely only on point addition. As a result, it implements a reduction in the depth of quantum resources needed to improve computational performance.

It should be understood that the present invention can be implemented in modified forms without departing from its essential characteristics, as described above. Therefore, the specified embodiments should be considered in an illustrative sense rather than a restrictive sense, and the scope of the present invention may be defined by the claims rather than the foregoing description. All differences within the equivalent scope of the claims should be interpreted as being included within the present invention.

The invention claimed is:

1. A low controlled NOT (CNOT) count quantum point doubling circuit, comprising:
  a first quantum register to which a control qubit |q⟩ is input, a second quantum register to which a quantum register value $|x_1\rangle$ is input, a third quantum register to which a quantum register value $|y_1\rangle$ is input, a first ancilla register to which $|0\rangle$ is input, and a second ancilla register to which $|0\rangle$ is input, wherein $x_1$ and $y_1$ are coordinate values indicating a point in an elliptic curve, $|x_1\rangle$ and $|y_1\rangle$ indicate quantum states thereof, and q represents a value of the input control qubit $|q\rangle$;

a division operation block configured to output a first value of the first ancilla register as $$anc_1 = \frac{y_1}{x_1},$$

using the quantum register values $|x_1\rangle$ and $|y_1\rangle$;

a first multiplication operation block with a triple-controlled gate structure configured to output a value of $y_A=0$, when q=1, and $y_A=y_1$, when q=0;

a CNOT gate configured to output a second value of the first ancilla register as $$anc_1 = \frac{y_1}{x_1} + x_1 = \lambda,$$

wherein $\lambda$ indicates a gradient having a value of $$\frac{y_1}{x_1} + x_1;$$

a controlled out-of-place squaring block configured to output a value of $y_B=\lambda^2$, when q=1, and $y_B=y_1$, when q=0;

a first Toffoli gate configured to output a value of $y_C\lambda^2+\lambda$, when q=1, and $y_C=y_1$, when q=0;

a constant addition block configured to output $y_D=\lambda^2+\lambda+a=x_3$, when q=1, and $y_D=y_1$, when q=0, wherein $x_3$ is a value derived from $x_1$ and $y_1$ in a point doubling calculation process, and a is a constant;

a first constant addition block configured to output a third value of the first ancilla register as $anc_1=\lambda+1$;

a controlled in-place squaring block configured to output a first value of the second ancilla register as $anc_2=(\lambda+1)x_3$, when q=1, and $anc_2=(\lambda+1)y_1$, when q=0;

a second multiplication operation block configured to output a value of $x_A=x_1^2$, when q=1, and $x_A=x_1$, when q=0; and a second Toffoli gate configured to output a value of $x_B=x_1^2+(\lambda+1)x_3=y_3$, when q=1, and $x_B=x_1$, when q=0, wherein $y_3$ is a value derived from $x_1$ and $y_1$ in the point doubling calculation process.

2. The circuit of claim 1, further comprising:
a controlled swap block configured to output swap: $x_B=x_3$, $y_D=y_3$, when q=1, and none: $x_B=x_1$, $y_D=y_1$, when q=0.

3. The circuit of claim 2,
wherein a final output value of the first ancilla register is $anc_1=|\lambda+1\rangle$, and a final output value of the second ancilla register is $anc_2=|(\lambda+1)x_3\rangle$ or $anc_2=|(\lambda+1)y_1\rangle$.

4. The circuit of claim 1, further comprising:
a third multiplication operation block configured to output a second value of the second ancilla register as $anc_2=0$; and
a controlled swap block configured to output swap: $x_B=x_3$, $y_D=y_3$, when q=1, and outputs none: $x_B=x_1$, $y_D=y_1$, when q=0.

5. The circuit of claim 4,
wherein a final output value of the first ancilla register is $anc_1=|\lambda+1\rangle$, and a final output value of the second ancilla register is $anc_2=|0\rangle$.

6. The circuit of claim 4, further comprising:
a second constant addition block configured to output a fourth value of the first ancilla register as $anc_1=(\lambda+1)-1=\lambda$ when q=1, and $anc_1=\lambda$ when q=0.

7. The circuit of claim 6, further comprising:
a negative control Toffoli gate configured to output a fifth value of the first ancilla register as $anc_1=\lambda$, when q=1, and $$anc_1 = \lambda - x_1 = \frac{y_1}{x_1},$$

when q=0; and a negative controlled division block configured to output a sixth value of the first ancilla register as $anc_1=\lambda$, when q=1, and $anc_1=0$, when q=0.

8. The circuit of claim 7,
wherein a final output value of the first ancilla register is $anc_1=|\lambda\rangle$ or $anc_1=|0\rangle$, and a final output value of the second ancilla register is $anc_2=|0\rangle$.

* * * * *